No. 875,793.  
PATENTED JAN. 7, 1908.  
J. B. EWER.  
COFFEE POT.  
APPLICATION FILED NOV. 24, 1906.
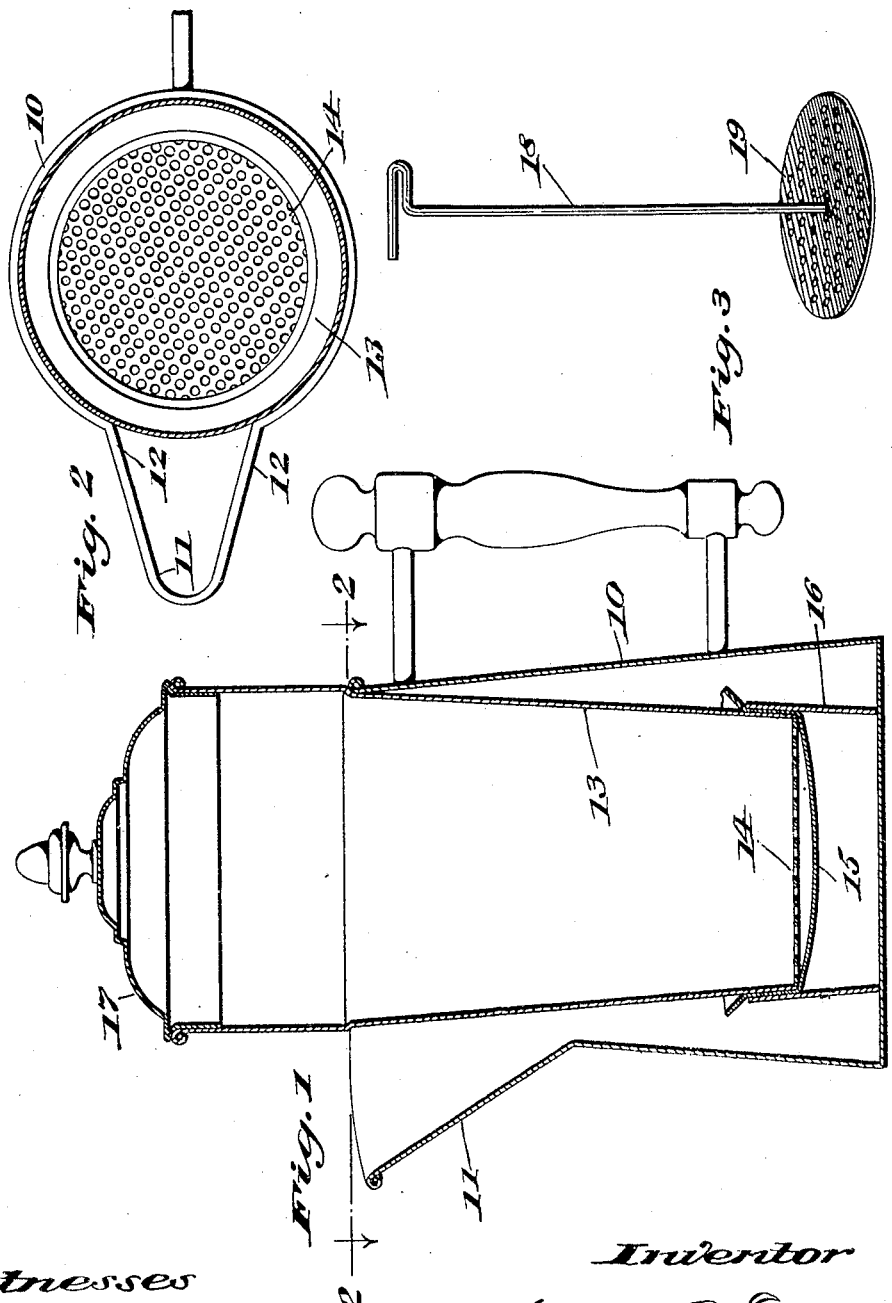

UNITED STATES PATENT OFFICE.

JAMES B. EWER, OF CHICAGO, ILLINOIS.

COFFEE-POT.

No. 875,793.  Specification of Letters Patent.  Patented Jan. 7, 1908.

Application filed November 24, 1906. Serial No. 344,814.

*To all whom it may concern:*

Be it known that I, JAMES B. EWER, a citizen of the United States, residing at Chicago, in the county of Cook and State of Illinois, have invented certain new and useful Improvements in a Coffee-Pot, of which the following is a specification.

This invention relates to that class of coffee-pots, in which the ground or pulverized coffee is placed in a vessel arranged in the main vessel or pot and wherein it is cooked or treated, and it consists in certain peculiarities of the construction, novel arrangement, and operation of the various parts thereof, as will be hereinafter more fully set forth and specifically claimed.

The object of the invention is to provide a coffee-pot, which shall be simple and inexpensive in construction, strong, durable, and effective in operation, and so made that the ground or pulverized coffee will be retained in an inner vessel in which it can be cooked or treated, so as to extract the essence therefrom, and in such a manner as to retain and condense the aroma and prevent it from passing off with the steam while the coffee is boiling.

Other objects and advantages of the invention will be disclosed in the subjoined description and explanation.

In order to enable others skilled in the art to which my invention pertains, to make and use the same, I will now proceed to describe it, referring to the accompanying drawing, in which—

Figure 1 is a central vertical sectional view of a coffee-pot embodying my invention, showing the parts in position ready for use. Fig. 2 is a plan sectional view taken on line 2, 2 of Fig. 1 looking in the direction indicated by the arrows;—and Fig. 3 is a perspective view of a stirrer, which may be used in connection with the pot.

Like numerals of reference, refer to corresponding parts throughout the different views of the drawing.

The reference numeral 10 designates the main or outer vessel of the pot, which may be of the ordinary or any preferred construction, but in the present instance is shown as being cylindrical in shape and enlarged towards its bottom, which is preferably flat, so as to rest flatly on the top of the stove when it is desired to make coffee. The upper portion of the main or outer vessel 10 is provided with a spout 11 which, by reference to Figs. 1 and 2, it will be seen has its inner portion open, thus permitting its sides 12 and the upper portion of the wall of the outer vessel to have a more or less resilient action, so that the inner vessel 13 may be easily inserted in the outer vessel, yet securely held therein until it is desired that the inner vessel may be moved or removed from the outer one.

As is clearly shown in Fig. 1 of the drawing, the inner vessel 13 is preferably made cylindrical in shape and slightly tapered toward its lower end, which is left open, but may be closed by means of a detachable perforated plate or disk 14, which is held in position by contact with the walls of the inner vessel, and also by means of a piece of gauze or cloth 15 of very fine mesh, which is disposed across the bottom of the vessel 13, and is held in place by means of an annular band 16, which is of sufficient size to surround the lower portion of the wall of the vessel 13 with the strainer or cloth 15 interposed therebetween. The band 16, as shown in Fig. 1, is open at its top and bottom, and the latter is adapted to rest directly on the bottom of the outer vessel when the parts are in position for making coffee. The upper end of the inner vessel 13 is closed by means of a cover 17, which fits closely therein, so as not to be easily displaced by steam pressure within the inner vessel.

The operation of the device is simple and as follows: The perforated disk 14 and strainer 15 are secured in place on the lower portion of the vessel 13, as above stated, and the said vessel is placed in the outer vessel so that the bottom of the band 16 will rest on the bottom of the outer vessel, when a sufficient quantity of ground or pulverized coffee may be placed in the vessel 13 and enough water to make the desired amount of coffee may be poured into the inner and outer vessels, when the pot may be placed on the stove in order to cook the coffee for a short time, in which operation the water and coffee within the inner vessel will be closely sealed therein by the water in the outer vessel, so that the ebullition or boiling of the water within the inner vessel will be independent from that contained in the outer vessel, and the steam produced from the water and coffee will be held in the upper portion of the inner vessel, thus retaining all of the aroma and strength of the extract of the coffee, while the steam from the water surrounding the inner vessel and located in the outer one will pass off through the spout 11. Should the pressure of the steam become too great, the inner vessel, by reason of its tapered form and by reason of the fact that it is yieldingly held by the outer vessel, will be slightly raised, so as to accommodate for the expansion of the steam, but none of it within the inner vessel will escape. After the coffee has been sufficiently cooked, the water contained in the outer vessel may be poured off into a cup or suitable receptacle, and by removing the cover 17, poured into the inner vessel, where it will mingle with the cooked coffee and water within the inner vessel, and pass therefrom under the bottom of the band 16 into the outer vessel, in which operation it will be thoroughly strained by means of the plate 14 and strainer 15, when it may be served for use.

In Fig. 3 of the drawing, I have shown a stirring device, which I may sometimes use in connection with the pot, and which consists of a stem 18 having on one of its ends a perforated disk 19 for agitating the coffee within the inner vessel.

Having thus fully described my invention, what I claim as new, and desire to secure by Letters Patent, is—

In a coffee pot, the combination with an outer vessel downwardly enlarged from its top to its bottom and having the upper portion of its wall bent outwardly to form a spout portion, the said spout portion having its entire inner portion opening into the vessel to afford resiliency to the upper portion of the wall thereof, of an inner vessel located in the outer vessel and frictionally held by the upper part of the wall thereof so that the inner vessel will be suspended within the outer one and its lower end located at a distance from the lower end of the outer vessel, a cover on the upper end of the inner vessel, a perforated disk and a strainer on the lower end of the inner vessel, and an open ended band surrounding the strainer and lower portion of the inner vessel and extended below the lower end of the inner vessel and having its entire lower edge located on the bottom of the outer vessel, substantially as described.

JAMES B. EWER.

Witnesses:
 CHAS. C. TILLMAN,
 M. A. NYMAN.